US008160323B2

(12) United States Patent
Zhou

(10) Patent No.: US 8,160,323 B2
(45) Date of Patent: Apr. 17, 2012

(54) LEARNING A COARSE-TO-FINE MATCHING PURSUIT FOR FAST POINT SEARCH IN IMAGES OR VOLUMETRIC DATA USING MULTI-CLASS CLASSIFICATION

(75) Inventor: Xiang Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 888 days.

(21) Appl. No.: 12/201,317

(22) Filed: Aug. 29, 2008

(65) Prior Publication Data
US 2009/0116716 A1 May 7, 2009

Related U.S. Application Data

(60) Provisional application No. 60/970,298, filed on Sep. 6, 2007.

(51) Int. Cl.
*G06K 9/00* (2006.01)
(52) U.S. Cl. ..................................................... 382/128
(58) Field of Classification Search .................. 382/128, 382/131
See application file for complete search history.

(56) References Cited

U.S. PATENT DOCUMENTS

| 5,987,094 | A * | 11/1999 | Clarke et al. | 378/62 |
| 7,949,173 | B2 * | 5/2011 | Zhou et al. | 382/131 |
| 2003/0074011 | A1 * | 4/2003 | Gilboa et al. | 606/130 |
| 2003/0099395 | A1 | 5/2003 | Wang et al. | |
| 2006/0002631 | A1 | 1/2006 | Fu et al. | |
| 2007/0081712 | A1 * | 4/2007 | Huang et al. | 382/128 |

FOREIGN PATENT DOCUMENTS
WO 2007/037848 A 4/2005

OTHER PUBLICATIONS

Zhou et al., "A Unified Framework for Uncertainty Propagation in Automatic Shape Tracking", in Proc. IEEE Conf. Computer Vision and Pattern Recognition, Washington, DC 2004.
Freund et al., "A Short Introduction to Boosting", Journal of Japanese Society for Artificial Intelligence, 14(5): 77 1-780, Sep. 1999.
Freund et al., "An Efficient Boosting Algorithm for Combining Preferences", in Proc. 15th Int'l Conference on Machine Learning, 1998.
Kumar et al., "Detecting Lesions in Magnetic Resonance Breast Scans", Proceedings of the SPIE—The International Society for Optical Engineering, SPIE, Bellingham, VA, vol. 2645, Jan. 1, 1996, pp. 181-190.
Yoshimura et al., "Fast template matching based on the normalized correlation by using multiresolution eigenimages", Intelligent Robots and Systems '94, Advanced Robotic Systems and the Real World, IROS'94, Proceedings of the IEEE/RSJ/GI International Conference on Munich, Germany, Sep. 12-16, 1994, New York, NY, IEEE, vol. 3, Sep. 12, 1994, pp. 2086-2093.
International Search Report including Notification of Transmittal of the International Search Report, International Search Report, and Written Opinion of the International Searching Authority.

* cited by examiner

*Primary Examiner* — Clayton E LaBalle
*Assistant Examiner* — Leon W Rhodes, Jr.
(74) *Attorney, Agent, or Firm* — Peter Withstandley

(57) ABSTRACT

A landmark location system for locating landmarks in volumes includes a medical image database including volumes of medical images, a learning unit that trains a multi-class classifier to locate a landmark point in each volume from extracted features of the volumes near a sample point offset from the landmark point and discrete displacements of the sample point to the landmark point, and a landmark locator that locates the landmark point in an input volume using the trained multi-class classifiers.

20 Claims, 6 Drawing Sheets

LEARNING A COARSE-TO-FINE MATCHING PURSUIT FOR FAST POINT SEARCH IN IMAGES OR VOLUMETRIC DATA USING MULTI-CLASS CLASSIFICATION

CROSS-REFERENCE TO RELATED APPLICATIONS

This application claims priority to U.S. Provisional Application No. 60/970,298, filed on Sep. 6, 2007, the disclosure of which is incorporated by reference herein.

BACKGROUND OF THE INVENTION

1. Technical Field

The present disclosure relates to location of landmark points of interest in volumetric data, and more particularly, to location of landmark points of interest in volumetric data using multi-class classifiers.

2. Discussion of Related Art

Medical imaging is generally recognized as important for diagnosis and patient care. In recent years, medical imaging has experienced an explosive growth due to advances in imaging modalities such as x-rays, computed tomography (CT), magnetic resonance imaging (MRI) and ultrasound. Many existing and emerging imaging modalities are showing great potential for supporting new or improved pre-clinical and clinical applications and workflows. These modalities include MRI, positron emission tomography (PET), single-photon emission computed tomography (SPECT), PET/CT, SPECT/CT, whole-body CT (MDCT), and PET/MR.

A landmark point location system can aid a user in quickly locating a landmark point of interest (e.g., the tip of the lungs) within a medical image comprising one of these imaging modalities. Such a system can result in a more efficient and accurate medical diagnosis.

Conventional landmark point location systems perform a search to exhaustively slide a scanning window over the input image to locate instances of the landmark point of interest. However, such searches are computationally intensive and time consuming.

Thus, there is a need for systems and methods that can more efficiently locate a landmark point of interest in one or more volumes.

SUMMARY OF THE INVENTION

According to an exemplary embodiment of the present invention, a landmark location system for locating landmarks in volumes includes a medical image database including volumes of medical images, a learning unit that trains a multi-class classifier to locate a landmark point in each volume from extracted features of the volumes near a sample point offset from the landmark point and discrete displacements of the sample point to the landmark point, and a landmark locator that locates the landmark point in an input volume using the trained multi-class classifiers.

According to an exemplary embodiment of the present invention, a method for training a multi-class classifier to locate a landmark of interest in an input image includes extracting features of a portion of a volume including a landmark point, wherein the portion is centered at a sample point in the volume and bounded by a first neighborhood size, selecting a displacement vector from a discrete list of displacement vectors that enables the sample point to be offset more closely to the landmark point, and training a current level of a multi-class classifier using the extracted features and the selected displacement vector.

According to an exemplary embodiment of the present invention, a method for using a multi-class classifier trained to locate a landmark of interest in a volume based on extracted features of the volume near a sample point offset from the landmark point includes extracting features from a portion of a volume bounded by a first neighborhood size, determining a displacement vector based on the extracted features and a current level of the multi-class classifier, and offsetting from a center point of the portion to a new center using a displacement vector corresponding to the features of the current level of the multi-class classifier.

According to an exemplary embodiment of the present invention, a method for using a multi-class classifier trained to locate a landmark of interest in a volume includes extracting features from a portion of a volume bounded by a neighborhood size and centered at a center point, determining a displacement vector based on the extracted features and a current level of the multi-class classifier, and offsetting from the center point of the portion to a landmark point in the volume using the determined displacement vector. The multi-class classifier was previously trained based on example features of the volume centered at a sample point offset from the landmark point and a learned associated displacement vector from the sample point to the landmark point.

An exemplary embodiment of the present invention includes a method for training a multi-class classifier to locate a landmark in a pair of images. The method includes selecting a neighborhood size, extracting first features of a first portion of a first volume including a landmark point, second features of a second portion of a second volume including the landmark point, and joint features across the first and second portion, selecting a displacement vector from a discrete list of displacement vectors that enables the sample point to be offset more closely to the landmark point, and training a current level of a multi-class classifier using the extracted features and the selected displacement vector. The first portion is centered at the landmark point and the second portion is centered at a sample point in the volume. Each of the portions are bounded by the selected neighborhood size.

An exemplary embodiment of the present invention includes a method for using a multi-class classifier trained to locate a landmark of interest in two target volumes, the multi-class classifier having been previously trained based on joint features across the two training volumes. The method includes extracting features from a portion of the first volume and the second volume bounded by a neighborhood size and centered at a center point and joint features between the first and second volumes, determining a displacement vector based on the extracted features and a current level of the multi-class classifier, and offsetting from the center point of the portion to the landmark point in the two volumes using the determined displacement vector.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

In general, exemplary embodiments for systems and methods for locating a landmark within one or more volumes will now be discussed in further detail with reference to illustrative embodiments of FIGS. 1-6. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
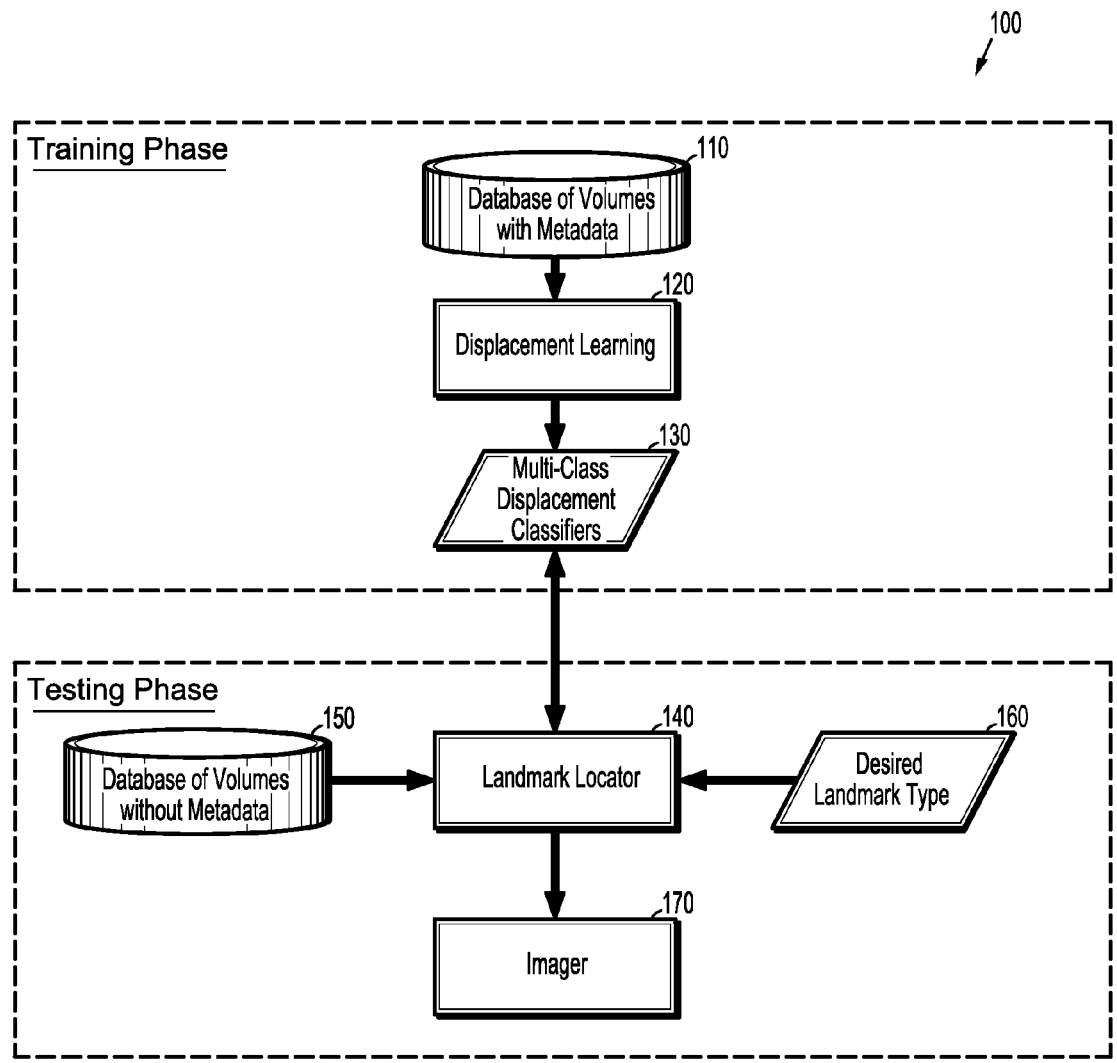
FIG. 1 illustrates a learning-based and database-guided framework to support automatic location of an object of interest, according to an exemplary embodiment of the present invention.

FIG. 1 illustrates a learning-based and database-guided framework to support automatic location of a landmark of interest, according to an exemplary embodiment of the present invention.

Referring to FIG. 1 the learning-based and database-guided framework 100 includes a training phase and a testing phase as indicated by the dashed boxes. The training phase shown in FIG. 1 includes a database 110 of volumetric data with associated metadata and displacement learning unit 120. The learning unit trains one or more multi-class classifiers 130 to locate a landmark point in each volume from extracted features of the volumes near a sample point offset from the landmark point and discrete displacements of the sample point to the landmark point. During the testing phase shown in FIG. 1, the landmark locator 140 uses a previously trained multi-class classifier 130 to locate an input landmark type 160 in an unmarked volume of the database 150 of volumes. Once the landmark is located, the image can be displayed on an imager 170, such as a display.

The volumetric data may include medical images. Examples of images include positron emission tomography (PET) images, computed tomography (CT) images, magnetic resonance imaging (MRI) images, single-photon emission computed tomography (SPECT) images, etc.

The metadata associated with each volume includes one or more landmarks within the volume. Each landmark represents a point of interest within the volume. For example, the landmark could an upper corner of a left lung, an upper corner of a right lung, a center of a left kidney, a center of a right kidney, or a tip of the lungs, etc. One particular landmark type (e.g., tip of the lungs) may be associated with several volumes. For example, the tip of the lungs may vary in location and appearance from patient to patient. Features of the volumes of the database 110 and positions of the corresponding landmarks are used as training data in the displacement learning unit 120. The learning unit trains one or more multi-class classifiers 130 to locate landmarks in unmarked volumes (e.g., those without landmarks) that are similar to those in the training data. A multi-class classifier 130 can be trained for each different landmark type.

Figure 2:
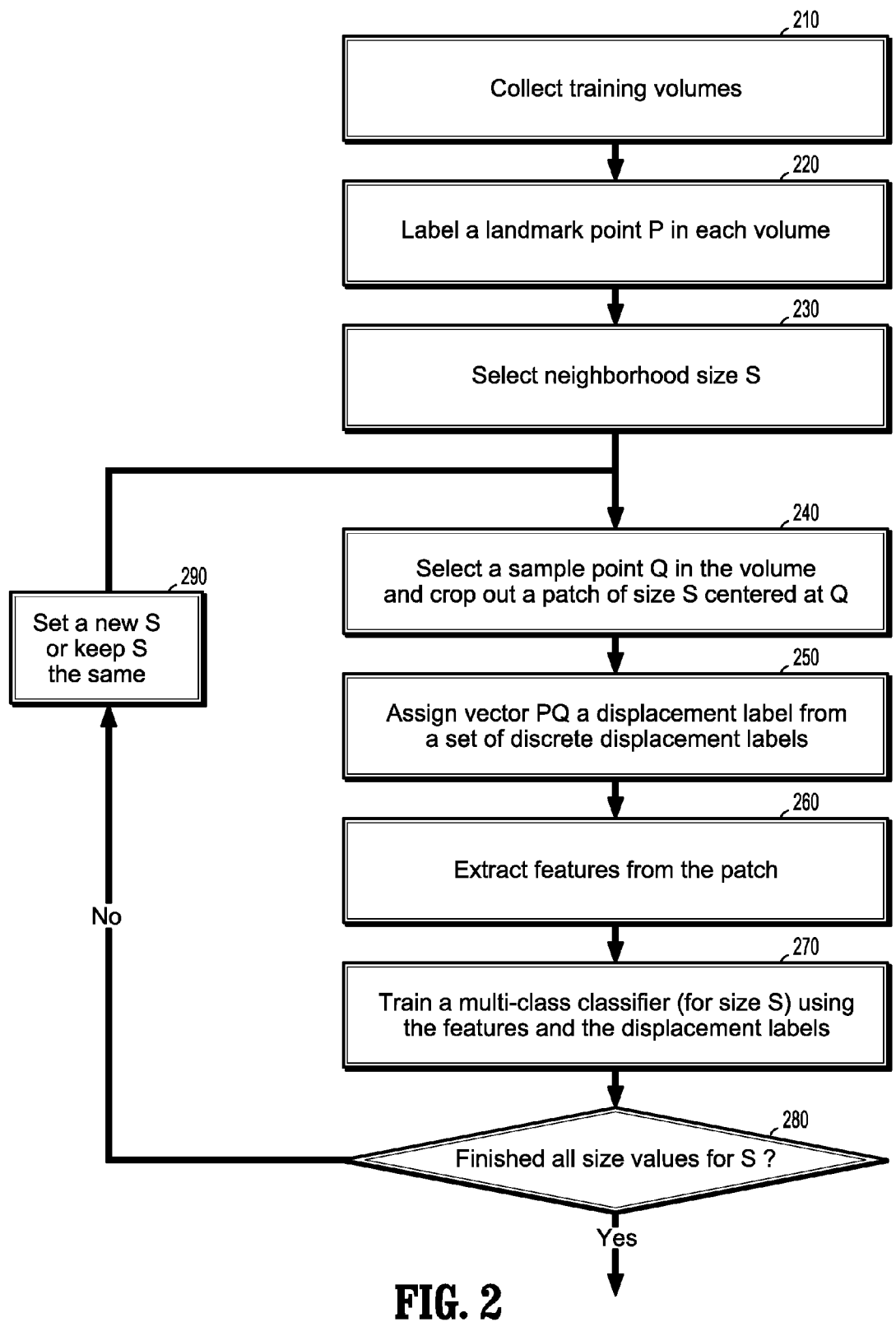
FIG. 2 illustrates a method of training a multi-class classifier, according to an exemplary embodiment of the present invention.
Figure 3:
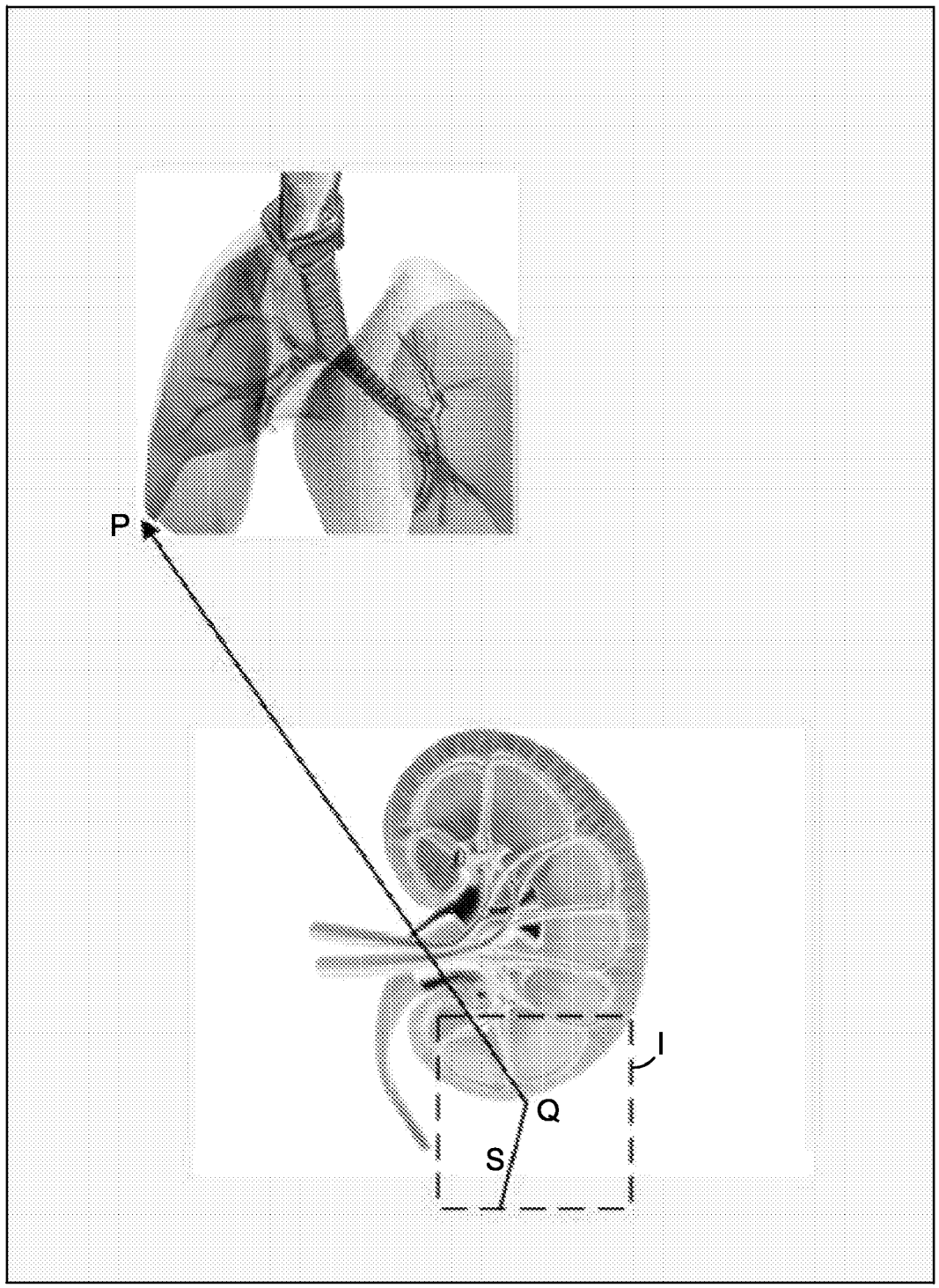
FIG. 3 illustrates an exemplary graphical depiction of portions of the method of FIG. 2.
Figure 4:
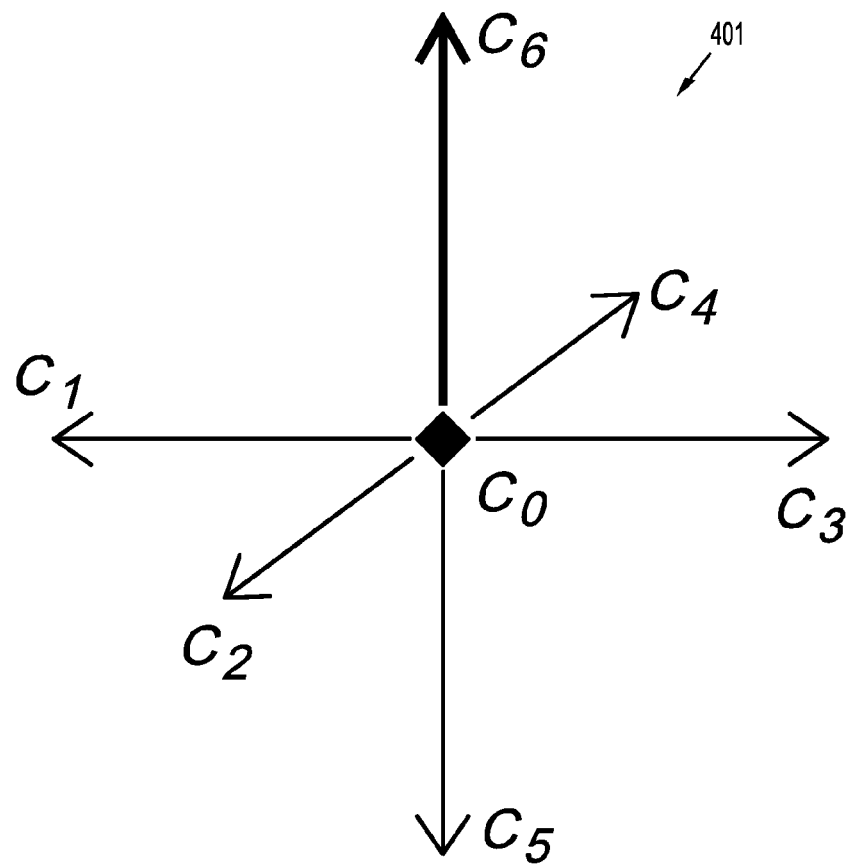
FIG. 4 illustrates an exemplary set of discrete displacement class labels that may be used in the method of FIG. 2.
Figure 4:
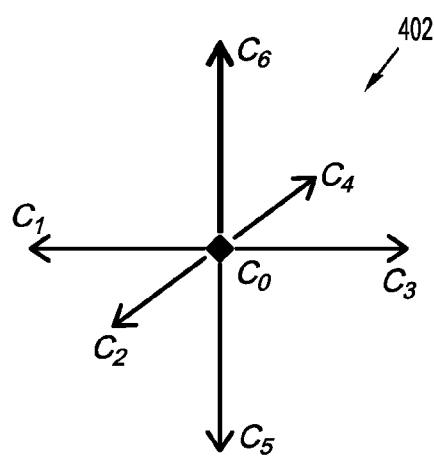

FIG. 2 illustrates a method of training a multi-class classifier 130 of FIG. 1, according to an exemplary embodiment of the present invention. FIG. 3 illustrates an exemplary graphical depiction of portions of the method of FIG. 2. FIG. 4 illustrates an exemplary set of discrete displacement class labels that may be used in the method of FIG. 2.

Referring to FIGS. 2 and 3, training data volumes are collected (S210). A landmark point P is labeled in each volume (S220). For example, FIG. 3 illustrates a landmark point P for the tip of the lungs. A neighborhood size S is then selected (S230). The size S can represent a radius of a cube with center Q or a radius of a sphere with center Q. The size S may correspond to a certain portion of the volume. For example, assume the volume is 100×100×100 voxels. When a cube is used, the size S may correspond to, for example, 10×10×10 voxels.

A sample point Q is then selected in the volume and an image patch I of size S is cropped centered around sample point Q (S240). A vector PQ is then assigned a discrete displacement class label from a set of discrete displacement class labels, based for example, on vector quantization (S250).

FIG. 4 illustrates examples of a first and second set of displacement class labels 401 and 402, where each displacement class label represents a different displacement vector (e.g., having a length and a direction). The first and second sets 401 and 402 both include 7 discrete displacement class labels $C^0$, $C^1$, ..., $C^7$ each representing 7 different corresponding displacement vectors. The class labels of the second set 402 represents displacement vectors of the same direction as the first set 401, but of half the length. While FIG. 4, illustrates that the sets 401 and 402 include 7 displacement class labels, embodiments of the present invention are not limited thereto. For example, each of the sets 401 and 402 may have any number of displacement class labels and may have a differing number of displacement class labels relative to another set. While FIG. 4 illustrates two different sets 401 and 402, the present invention is not limited thereto. For example, any number of sets may be used. Multi-classification in a coarse-to-fine setting may include multiple such sets, where each subsequent set's labels represent displacement vectors of smaller and smaller lengths (e.g., L, L/2, L/4, L/8, etc.).

One of the displacement labels in each set may have a zero displacement (e.g., $C_0$). The lengths of the non-zero displacement labels may be set, for example, to the neighborhood size S. For example, FIG. 4 illustrates set 401 having displacement class labels corresponding to size S and set 402 having displacement class labels corresponding to size S/2. The displacement class label among the chosen set may be chosen by selecting the label whose associated displacement vector would move sample point Q more closely or closest to landmark point P.

The features of scanning patch I are then extracted (S260). The features may be extracted, for example, by applying a wavelet transform to the image bounded by the scanning patch I to generate a plurality of wavelet coefficients. A current level of a multi-class classifier (for neighborhood size S) is trained using the extracted features and the assigned label (S270).

The neighborhood size S can be kept at its current value (S290), and then the scanning patch I can be moved by the displacement vector (or an opposite displacement vector) associated with the assigned displacement class label to generate a new scanning patch, with a new Q, and generating a new vector PQ. As before, the new vector PQ may be assigned a new displacement label from the set of displacement class labels and features of the image bounded by the new scanning patch may be extracted. The new features and displacement label may then be applied to the same level of the multi-class classifier. This process may then be repeated until Q has been moved as close to landmark point P as the set of displacement labels permit. At this point, the first or highest level of the multi-class classifier has been trained.

The neighborhood size S can then be set to a smaller value (e.g., S/2) (S290). The above process can then be repeated to train subsequent lower resolution levels of the multi-class classifier. When it has been determined that all desired neighborhood sizes S have been run through (S280), the multi-class classifier has completed its training. The last displacement class label assigned in each level of the multi-class classifier may indicate that no further offsetting is necessary (e.g., class label $C_0$, which indicates a zero displacement).

The above process can then be repeated on multiple volumes, enabling each level of the multi-class classifier to include features of the multiple volumes and their corresponding displacement class labels.

Figure 5:
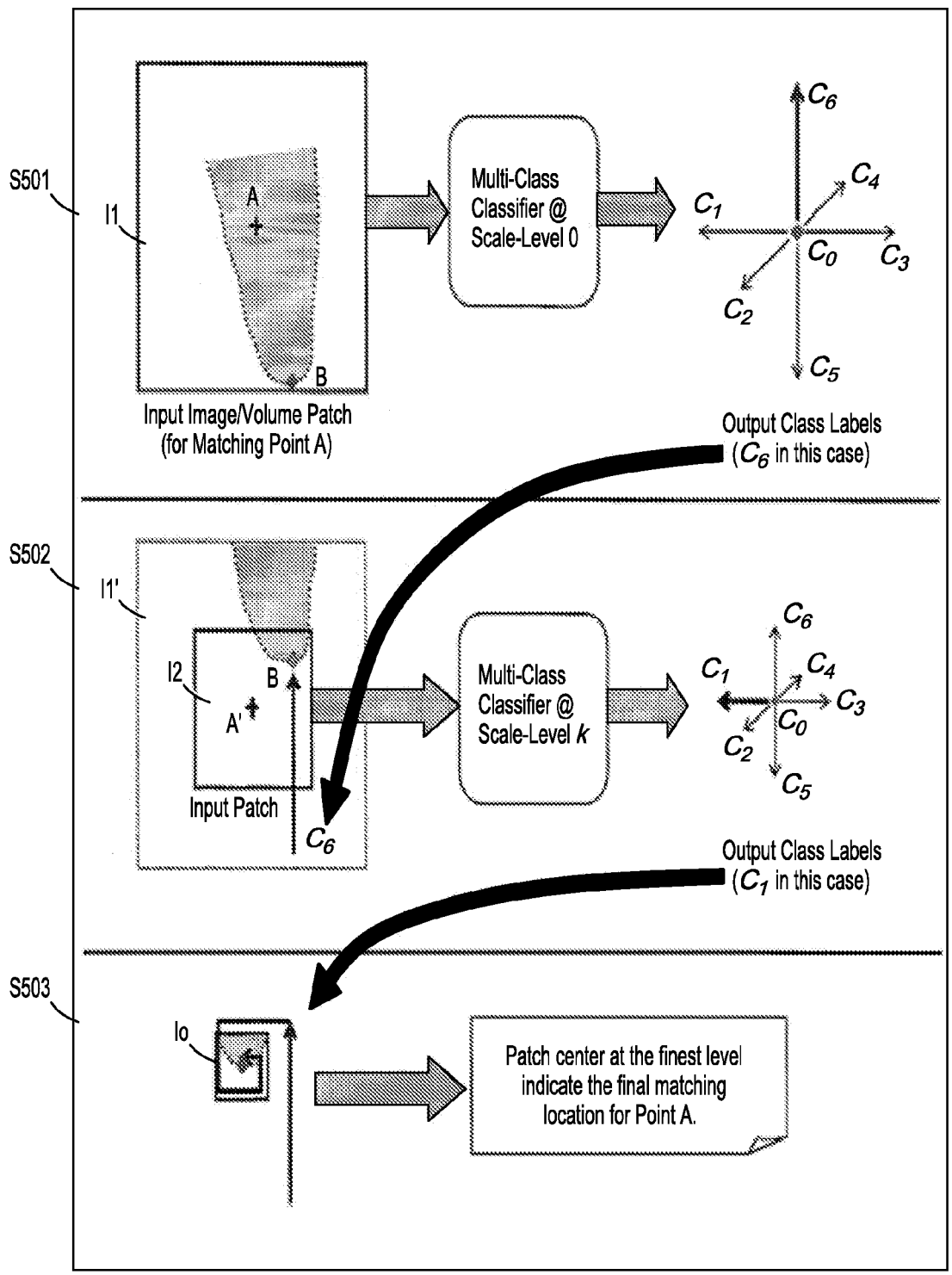
FIG. 5 illustrates a method of using the trained multi-class classifier of FIG. 2 to locate a landmark of interest in a volume.

FIG. 5 illustrates a method of using the trained multi-class classifier discussed with respect to FIGS. 2-4 to locate a landmark of interest (e.g., the tip of the lungs) in a volume. Referring to FIG. 5, point A represents the center of a scanning patch I1 over the volume and point B represents the center of the landmark of interest, which is currently unknown. Referring to step S501 of FIG. 5, the scanning patch I1 is set to the neighborhood size S of the first level (e.g., level 0) of a multi-class classifier trained for the landmark of interest. The features of the image bounded by the scanning patch I1 are extracted and compared against the features in the first level of the multi-class classifier. When the comparison indicates that the features match closely enough with features in the classifier, the corresponding class label of that match is returned. For example, as described above, a wavelet transform may be applied to the image in the scanning patch I1 to generate wavelet coefficients. The wavelet coefficients of the scanning patch I1 can then be compared against those of the classifier. A match would then result when the difference between the features or coefficients are within a predefined range. In this example, a match occurred, which returned class label $C_6$, indicating that the scanning patch I1 is somewhat north of point B. In step S502, the scanning patch I1 is moved by a displacement that is opposite that of the displacement represented by class label $C_6$ to generate a new point A' and a new scanning patch I1'. The features of the new scanning patch I1' may also be compared against the features of the first level of the multi-class classifier. However, in this example, it is assumed that either no match is returned or that a displacement of zero is returned, indicating advancement to the next resolution level K of the multi-class classifier. The scanning patch I' is then set to the neighborhood size (e.g., S/2) of the next level K to generate scanning patch I2. The features of scanning patch I2 are extracted and compared with the features of level K of the multi-class classifier as before. In this example, a match occurred, which returned class label $C_1$, indicating that patch I2 is somewhat west of point B. The above process may be repeated for subsequent levels of the multi-class classifier until an optimum image patch Io centered at point B is located (S503).

Figure 6:
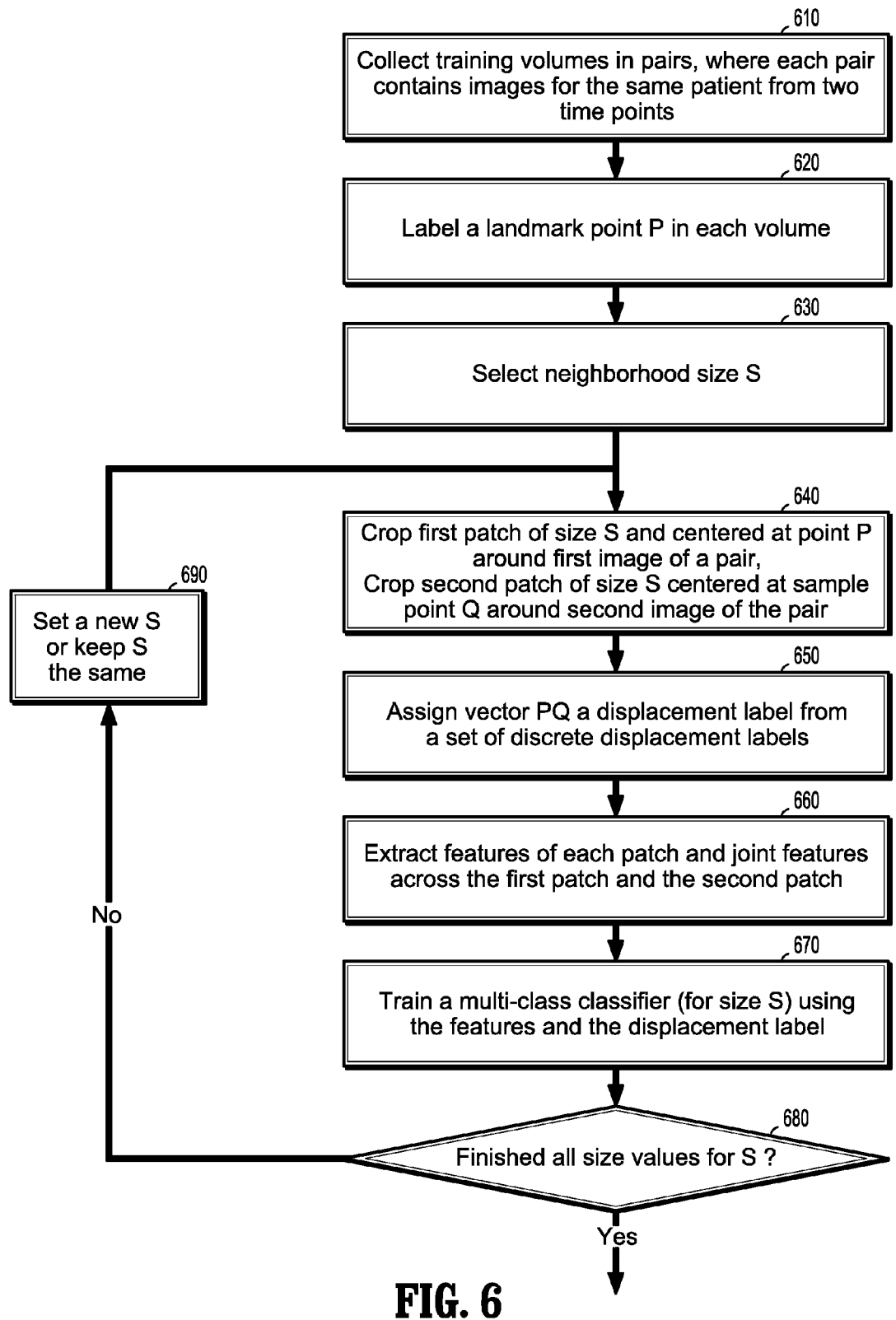
FIG. 6 illustrates a method for training a multi-class classifier according to another exemplary embodiment of the present invention.

FIG. 6 illustrates a method for training a multi-class classifier according to another exemplary embodiment of the present invention. Referring to FIG. 6, training data volumes are collected in pairs (S610). Each pair contains images for the same patient from two different points in time. Next, a landmark point P is defined in each volume (S620). For example, a landmark point P is set in both images of the pair. Next, a neighborhood size S is selected (S630). A first scanning patch centered at landmark point P of size S is then cropped around a first image of a pair and a second scanning patch centered at sample point Q of size S is cropped around a second image of the pair (S640). A vector PQ is then assigned a displacement label from the set of discrete displacement labels (S650). Features are then extracted from the images bounded by each scanning patch and joint features across the images bounded by the first scanning patch and the second scanning patch (S660).

A multi-class classifier (for size S) is then trained using the features of each scanning patch, the jointly extracted features, and the displacement labels (S670). The joint features may selected from those that more accurately enable a registration of the two volumes. For example, an image of the lungs includes features of the upper portion of the lungs and features of the lower portion of the lungs. Since the lower portion of the lungs can move from time to time (e.g., due to breathing), it can be difficult to register images based on features of the lower portion of the lungs. For example, a registration of the two images (e.g., an alignment) can be more easily performed by aligning features (e.g., similar edges, similar texture, etc.) indicative of the upper portions of the lungs.

The neighborhood size S can be kept at its current value (S690), and then the second scanning patch can be moved by a displacement vector associated with the assigned displacement class label to generate a new second scanning patch that more closely registers with the first scanning patch. The new second scanning patch has a new Q, which is used to generate a new vector PQ. As before, the new vector PQ may be assigned a new displacement label from the set of displacement class labels. New features of the image bounded by the new second scanning patch may then be extracted and new joint features across an image bounded by the new second scanning patch and an image bounded by the first patch may be extracted. The newly extracted features and displacement labels may then be applied to the same level of the multi-class classifier. This process may be repeated until Q has been moved as close to landmark point P as the set of displacement labels permit. At this point, the first or highest level of the multi-class classifier has been trained.

The neighborhood size S can then be set to a smaller value (S690). For example, S may be set to lower values (e.g., S/2) for respectively training lower levels (e.g., scales or resolutions) of the multi-class classifier. The above process can then be repeated to train subsequent lower resolution levels of the multi-class classifier. When it has been determined that all desired neighborhood sizes S have been run through (S680), the multi-class classifier has completed its training.

The trained multi-class classifier can then be used to locate a landmark point of interest within a pair of volumes including images of a patient from two different points in time and to register the volumes with one another. For example, assume a current viewing window is offset within each of the volumes some distance away from the landmark point of interest. Features of a first and second scanning patch of neighborhood size S over the respective volumes, and joint features across each of the patches can be passed to the first-level of the multi-class classifier to return a displacement label that can be used to offset within each of the volumes towards the landmark point of interest such that the two volumes better register with one another. Subsequent levels of the multi-class classifier are used in a coarse to fine manner to offset the current viewing window even closer to the landmark point of interest and to register more closely each of the volumes with one another. For example, the current viewing window in each volume may be offset by a displacement associated with the returned displacement label. The neighborhood size may be, for example, halved, to generate new first and second scanning patches of neighborhood size S/2. The features of each of the new first and second scanning patches and the new joint features across the patches can be extracted and passed to the second or subsequent level of the multi-class classifier to yield an even finer displacement label. In this way, the current viewing window can be offset within each volume to get even closer to the landmark point of interest and yield an even more accurate registration amongst the volumes.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A landmark location system for locating landmarks in volumes, the system comprising:
   a processor; and
   one or more non-transitory program storage devices readable by the processor, tangibly embodying a medical image database, a learning unit and a landmark locator executable by the processor,
      wherein the medical image database includes volumes of medical images,
      wherein the learning unit is configured to train a current level of a multi-class classifier to locate a landmark point in each volume from extracted features of the volumes bounded by a neighborhood size and near a sample point offset from the landmark point by using discrete displacements of the sample point to the landmark point, wherein at least one of the discrete displacements includes a vector of zero displacement or a length that corresponds to the neighborhood size, and
      wherein the landmark locator is configured to locate the landmark point in an input volume using the trained multi-class classifier.

2. The landmark location system of claim 1, wherein the extracted features of each subsequent level of the multi-class classifier are of a higher resolution than a previous level.

3. The landmark location system of claim 1, wherein the discrete displacements of each subsequent level of the multi-class classifier are smaller than a previous level.

4. The landmark location system of claim 3, wherein the discrete displacements of each subsequent level of the multi-class classifier are half that of a previous level.

5. The landmark location system of claim 1, wherein the volume are obtained using one of positron emission tomography (PET), computed tomography (CT), magnetic resonance imaging (MRI), or single-photon emission computed tomography (SPECT).

6. A method for training a multi-class classifier to locate a landmark of interest in an input image, the method comprising:
   extracting features of a portion of a volume including a landmark point, wherein the portion is centered at a sample point in the volume and bounded by a first neighborhood size;
   selecting a displacement vector from a first list of discrete displacement vectors that enables the sample point to be offset more closely to the landmark point, wherein the first list of discrete displacement vectors includes a vector of zero displacement or a length that corresponds to the first neighborhood size; and
   training a current level of a multi-class classifier using the extracted features and the selected displacement vector.

7. The method of claim 6, further comprising:
   offsetting the sample point by the selected displacement vector and extracting second features of the volume centered at the offset sample point and bounded by a second neighborhood size that is smaller than the first neighborhood size;
   selecting a second displacement vector from a second list of discrete displacement vectors that enables the offset sample point to be offset more closely to the landmark point; and
   training a subsequent level of the multi-class classifier using the second extracted features and the second selected displacement vector.

8. The method of claim 7, wherein the second list of displacement vectors includes a vector of zero displacement and each of the other displacement vectors have a length that corresponds to the second neighborhood size.

9. The method of claim 7, where the second neighborhood size is half the size of the first neighborhood size.

10. The method of claim 6, wherein the landmark point corresponds to one of an upper corner of a left lung, an upper corner of a right lung, a center of a left kidney, a center of a right kidney, or a tip of the lungs.

11. The method of claim 6, wherein the volume is obtained using one of positron emission tomography (PET), computed tomography (CT), magnetic resonance imaging (MRI), or single-photon emission computed tomography (SPECT).

12. The method of claim 6, wherein the portion is one of a cube or a sphere and the neighborhood size corresponds to a circumradius of the cube or a radius of the sphere.

13. The method of claim 6, wherein the neighborhood size is less than or equal to a radius or circumradius of the volume.

14. The method of claim 6, wherein the first list of displacement vectors includes a vector of zero displacement and each of the other displacement vectors have a length that corresponds to the neighborhood size.

15. The method of claim 6, wherein the features are extracted using a wavelet transform.

16. A method for using a multi-class classifier trained to locate a landmark of interest in at least one target volume, the multi-class classifier having been previously trained based on example features of at least one training volume centered at a sample point offset from the landmark point and a learned associated displacement vector from the sample point to the landmark point, the method comprising:

extracting features from a portion of the at least one target volume bounded by a neighborhood size and centered at a center point;

determining a displacement vector selected from a list of discrete displacement vectors based on the extracted features and a current level of the multi-class classifier, wherein the list of discrete displacement vectors includes a vector of zero displacement or a length that corresponds to the neighborhood size; and offsetting from the center point of the portion to the landmark point in the at least one target volume using the determined displacement vector.

17. The method of claim 16, wherein the multi-class classifier was further previously trained using example features of a second volume of the at least one training volume centered at the landmark point.

18. A non-transitory program storage device readable by machine, tangibly embodying a program of instructions executable by the machine to perform method steps for training a multi-class classifier to locate a landmark in a pair of images, the method steps comprising:

selecting a neighborhood size;

extracting first features of a first portion of a first volume including a landmark point, second features of a second portion of a second volume including the landmark point, and joint features across the first and second portion, wherein the first portion is centered at the landmark point and the second portion is centered at a sample point in the volume, and each of the portions are bounded by the selected neighborhood size;

determining a displacement vector from a list of discrete displacement vectors that enables the sample point to be offset more closely to the landmark point, wherein the list of discrete displacement vectors includes a vector of zero displacement or a length that corresponds to the neighborhood size; and training a current level of a multi-class classifier using the extracted features and the determined displacement vector.

19. The program storage device of claim 18, further comprising:

offsetting the sample point by the determined displacement vector;

resizing the neighborhood size so that it is smaller; and repeating the steps of extracting, determining and training until a predetermined threshold has been reached.

20. A method for using a multi-class classifier trained to locate a landmark of interest in two target volumes, the multi-class classifier having been previously trained based on joint features across the two training volumes, the method comprising:

extracting features from a portion of the first volume and the second volume bounded by a neighborhood size and centered at a center point and joint features between the first and second volumes;

determining a displacement vector from a list of discrete displacement vectors based on the extracted features and a current level of the multi-class classifier, wherein the list of discrete displacement vectors includes a vector of zero displacement or a length that corresponds to the neighborhood size; and offsetting from the center point of the portion to the landmark point in the two volumes using the determined displacement vector.

* * * * *